United States Patent [19]

Bettermann et al.

[11] 3,742,614

[45] July 3, 1973

[54] THERMAL TREATMENT OF POWDERED OR GRANULAR MATERIAL

[75] Inventors: Dieter Bettermann, D-5022 Junkersdorf; Alois Schomisch, D-5302 Widdig, both of Germany

[73] Assignee: Leybold-Heraeus-Verwaltung GmbH, Koln-Bayental, Germany

[22] Filed: Oct. 4, 1971

[21] Appl. No.: 185,949

[30] Foreign Application Priority Data
Oct. 2, 1970 Germany.................. P 20 48 487.1
Oct. 2, 1970 Germany.................. P 20 48 494.0

[52] U.S. Cl......................... 34/147, 34/92, 34/164, 34/178
[51] Int. Cl. ...................................................... F26b
[58] Field of Search .................. 34/15, 92, 39, 147, 34/171, 178, 164, 51

[56] References Cited
UNITED STATES PATENTS

| | | | |
|---|---|---|---|
| 2,523,552 | 9/1950 | Birdseye ............... | 34/164 |
| 2,935,763 | 5/1960 | Newman et al........... | 34/92 |
| 2,946,429 | 7/1960 | Carrier................. | 34/147 |
| 2,983,051 | 5/1961 | Zimmermann et al. ..... | 34/164 |
| 3,154,621 | 10/1964 | Alban .................. | 34/164 |
| 3,574,951 | 4/1971 | Oetjen et al. .......... | 34/92 |

*Primary Examiner*—Carroll B. Dority, Jr.
*Assistant Examiner*—Larry I. Schwartz
*Attorney*—George H. Spencer et al.

[57] ABSTRACT

A device for the thermal treatment of powdered or granular materials, including a container, a plurality of substantially circular trays mounted one above the other in said container for the sequential transfer of material downwardly from an outlet region of one tray to an inlet region of a next lower tray, a temperature control system for selectively controlling the temperatures of the trays, and a vibrational drive vibrating the trays selectively and adjustably for moving material on the trays from their inlet regions to their outlet regions with preselected material layer depths.

A method for drying granular or powedered polymer material having a crystallization temperature region below 200° C, in a drying chamber maintained at a pressure of less than one torr and equipped with a material-receiving surface, which method includes forwarding the material on the surface by vibration in a layer of less than a predetermined layer depth, for preventing agglomeration when the material is in its crystallization temperature region, and bringing the temperature of the material into its crystallization temperature region.

11 Claims, 9 Drawing Figures

United States Patent [19]
Bettermann et al.
[11] 3,742,614
[45] July 3, 1973
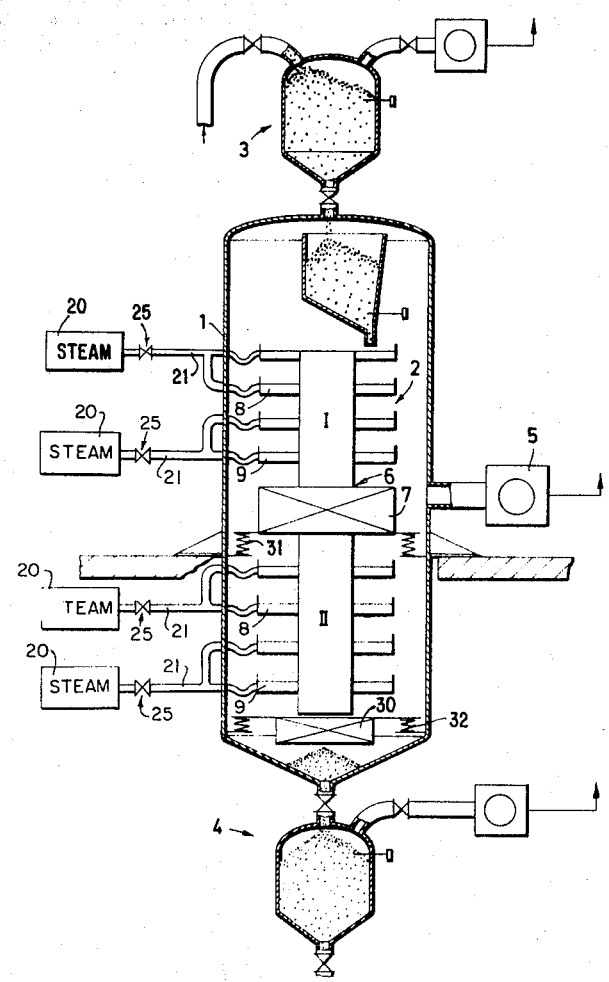

3,742,614

THERMAL TREATMENT OF POWDERED OR GRANULAR MATERIAL

BACKGROUND OF THE INVENTION

The present invention relates to a device for the thermal treatment of powdered or granular material and more particularly to a device for the vacuum drying of such material in which the charge is forwarded on a plurality of sequentially arranged treatment surfaces by vibration. The present invention also relates to a method for drying granular or powdered material, and more particularly polymer material having a crystallization phase below 200° C, to a final moisture content below 0.1 weight-percent.

An earlier device for thermally treating powdered or granular material is disclosed in U. S. Pat. No. application Ser. No. 16,667, filed March 5, 1970, by Hanns Eilenberg for a "Vacuum Dryer for Flowable Material." In that device, material charged to it moves through, always with the same velocity. The depth of the layer of material moving through the device is always the same. Also, all of the treating surfaces in the device exhibit the same temperature during the time that material is flowing through.

In the drying of crystallizing, granular or powdered plastics, which may frequently be air or oxygen sensitive, there is the danger that the powdered or granular material may reach its crystallization temperature region, due to the introduction of the heat required for drying. In this region, the powdered or granular material agglomerates very quickly, so that relatively large chunks of material result. These chunks dry only very poorly and, additionally, clog the drying apparatus.

Crystallizing, granular or powdered plastics have been treated batch-wise in a gyratory vacuum dryer. Gyratory dryers are cylindrical, reclining containers, which rotate about a reclining axis passing outside of their central axis. The heating medium circulates through a double shell. The heat exchanging surface is small in relationship to the amount of material charged (around 1,000 kilograms), so that long drying times result. Due to the discontinuous, batch type operation, temporary storage of the product is required before and after the thermal treatment. This is especially a problem when the granular material must not come in contact with air or oxygen.

In drying a product of the type described in a gyratory dryer to an end moisture content of about 0.1 percent, total batch times of 16 to 24 hours result. These times can be somewhat shortened by building-in structure to enlarge the total heat exchanging surface and to provide increased movement in the product. Yet, the batch times are only reduced to around 12 to 16 hours.

And, these batch times are only valid for plastics that do not reach their crystallization temperature region during the drying. In the case of plastics with low crystallization temperature regions, one is forced to operate with low heating-medium temperatures, in order to prevent poorly drying agglomerates; the batch drying times are naturally correspondingly increased.

The gyratory dryer is furthermore very space-demanding, since bunker and transport equipment cannot be eliminated. In an operation where all process steps are run continuously, drying in a gyratory dryer represents a disturbing interruption of the product flow. An additional disadvantage lies in that, after each batch, an intensive and frequently difficult cleaning of the dryer must be carried out.

Also used for thermally treating crystallizing, granular or powdered plastics have been continuous processes utilizing the fluidized-bed concept. In these processes, gas flows upwardly through a column of product. Using water-vapor-partial-pressure and temperature of the gas, material and heat transport is carried out. Along with the continuous operation of these processes, it has been possible to significantly reduce drying times. These processes operate at normal pressure; air or nitrogen is used as gas. The gas is dried and given the proper temperature and is usually re-circulated and continuously regenerated. When a plastic tends to discolor at higher temperatures due to the influence of oxygen, nitrogen is used as gas.

The advantage of the good heat transfer characterizing these fluidized-bed processes brings with it, however, a disadvantage. Due to the fluidizing of the solid particles by the gas and especially when operating continuously, the single particles experience different residence times in the fluidized column. Certain particles pass from the inlet of the column to the outlet on the fastest and shortest path, while other particles are apt to rise and fall within the column several times before reaching the outlet.

Another disadvantage inherent in the fluidizing is a wearing of the individual particles. Product is reduced in size and the resulting dust must be seperated from the gas.

In general, fluidized-bed systems are, together with the above-described disadvantages, more demanding of maintenance, and they present very significant difficulties for the provision by automatic control of a stable operation.

SUMMARY OF THE INVENTION

An object of the invention, therefore, is to provide an improved device of the type disclosed in U. S. Pat. No. application Ser. No. 16,667, to dry crystallizing, granular or powdered polymer material with far better results than have yet been obtained with gyratory dryers and fluidized-bed dryers.

Another object of the invention is to provide a device for the thermal treatment, especially vacuum drying, of powdered or granular material, where the charged material is moved by vibration on a plurality of sequentially arranged treatment surfaces, and where it is possible to set in simple manner the conditions required for an optimum thermal treatment.

Yet another object of the invention is to provide a process for drying granular or powdered polymer material having a crystallization temperature region below 200° C to a final moisture content below 0.1 weight-percent, which process escapes the disadvantages as above-described, and in particular escapes the troublesome agglomeration of the processes of the past.

These as well as other objects which will become apparent in the discussion that follows are achieved, according to the present invention, by a device including a container, a plurality of substantially circular trays mounted one above the other in the container for the sequential transfer of material downwardly from an outlet region of one tray to an inlet region of a next lower tray, a means for selectively controlling the temperatures of the trays, and means for vibrating the trays selectively and adjustably for moving material on the trays from their inlet regions to their outlet regions with preselected material layer depths; and by a process wherein the layer depth of crystallizing, powdered or granular material is controlled at less than a predetermined thickness, for preventing agglomeration when the material is in its crystallization temperature region, and the surface carrying the layer is heated for bringing the temperature of the material into its crystallization temperature region.

GENERAL ASPECTS OF THE INVENTION

In the process of the present invention, crystallizing, powdered or granular polymer material is moved continuously through a chamber maintained at a pressure of less than one torr with varying material layer depth and correspondingly changed forward velocity by vibrating heat transfer surfaces The layer thickness and the temperature in various sections are selected so that no disturbing agglomeration occurs when the material is heated into and above the crystallization temperature region.

The process of the invention is based on the discovery that granular or powdered synthetic polymer material of relatively low crystallization temperature region can be heated into and above its crystallization temperature region without there occurring agglomeration of the particles, if the material layer depth is held below a predetermined thickness. When crystallization is finished, the layer thickness can be increased for optimizing drying time and throughput.

The device of the present invention is based on the discovery of the effect of layer depth on the drying of crystallizing, powdered or granular synthetic polymers and, in general, on the principle that both faster drying times and a more protective treatment of a charge are effected, when the product layer depth, that is to say the forwarding velocity of the product layer and the temperature of the material receiving trays can be selectively and adjustably controlled. In other words, a faster and yet more tender thermal treatment of a powdered or granular product can be obtained, when the product moving through the device is treated using a velocity and temperature program corresponding to the specific physical properties of the product.

The device of the invention includes a container and a plurality of substantially circular treating trays arranged cascade-like one above the other in the container. The trays are singly or collectively heatable or coolable to varying temperatures. The forwarding of the product on the trays is accomplished by vibration in manner known per se. During transport around the axis of a tray, each particle of product moves with the same angular velocity. When the material has been forwarded to an outlet region of a tray, it falls down onto the inlet region of the next lower tray. According to the present invention, the characteristics of the vibrations are changeable for the purpose of varying the forwarding speed. In this way, substantial differences in the residence times and layer depths on the individual trays can be obtained. Thus, the vibrational amplitudes of single trays or groups of trays can be selected to this end. The throughput of the individual trays, measured for example in kg/h, is a constant. Thus, for any two trays 1 and 2 having different forwarding velocities $V_1$ and $V_2$ and different layer depths $t_1$ and $t_2$, the forwarding velocities and layer depths are related by the equation $V_1 \times t_1 = V_2 \times t_2$.

The device of the present invention makes it possible to subject a material to thermal treatment, as it moves continuously through cascaded trays, under extremely varied conditions of temperature, layer depth, and velocity as selected in view of the particular properties of the material being treated. The forwarding of the material by vibration has the advantage that a good heat transfer is assured. Moreover, a vibrational drive is capable of excellent control, so that adjustment into various vibration amplitudes for the treatment trays for influencing the velocity and layer depth of the material being treated is possible in simple manner. Because the treatment conditions can be varied in such wide ranges, it is possible to subject almost all flowable solids to thermal treatment in the device of the invention.

For the production of varying velocities for the material on the trays of the device, a number of vibrational drives can, for example, be provided. Significantly more advantageous, however, is to provide only one vibrational drive, about midway in the height of the cascade, but outside of the center of mass of the cascade. Then the upper and lower parts of the cascade vibrate with different amplitudes, and this results in differing forwarding velocities for the powdered or granular material. For the drying, crystallization, and solid condensation of polymers, the ability to obtain different material forwarding velocities is especially advantageous, since critical phases, such as sudden intensive heating or cooling, can be passed through with short residence times, while, for processes which physically of necessity require more time, longer residence times can be chosen.

It is possible to arrange the vibrational drive substantially in the center of mass of the cascade. In this case, different vibrational amplitudes can be produced for the upper and lower sections of the cascade by equipping one or the other of the sections with an auxiliary mass. By correctly choosing the size of the auxiliary mass and placing it in the proper one of the two sections, the residence times, and consequently the layer depths of the material in the two cascade halves can be varied at will.

To produce an especially effective action of the different thermal characteristics of the cascade on the material running through it, it is advantageous to provide devices in the area of the treating trays for producing an increased agitation in the powdered or granular material. Examples of such devices are a paddle wheel for continually scooping material out of the material layer and then pouring it back and a row of jets directing pressurized gas into the layer to cause a temporary fluidizing for the benefit of its mixing effect.

An intensive mixing of the charged material can also be obtained by arranging the treating trays like the steps of a helical staircase. Mixing occurs when the material falls from one tray to the next. The same effect can be obtained when the individual treatment trays are arranged parallel one above the other and a fall chute is positioned between the outlet region of an upper tray and the inlet region of the lower tray.

For the process of the present invention, the forwarding of the charged material by vibration has the advantage that an effective and uniform heat transfer is assured. Moreover, the ease with which vibrational drives can be controlled provides for good control of other process parameters. The product undergoes negligible mechanical wear and does not stick to the heat transfer surfaces. The form of the heat transfer surfaces can be chosen as desired.

The essential advantages of the process according to the invention as compared with drying in a gyratory dryer lie in the significantly shorter drying times and in the continuous operation. Space-consuming, temporary storage of material is no longer necessary. Moreover, compared with the fluidized-bed process, the present invention has the advantages that the uncontrollably different residence times of particles in the fluidized column are not present and that the drying of air or oxygen-sensitive polymers does not require special, expensive measures.

Mixing of the powdered or granular material as it is forwarded in the process of the present invention is advantageous for improving heat transfer from the surface on which the material is being forwarded into the material.

DESCRIPTION OF THE PREFERRED EMBODIMENTS

Figure 1:
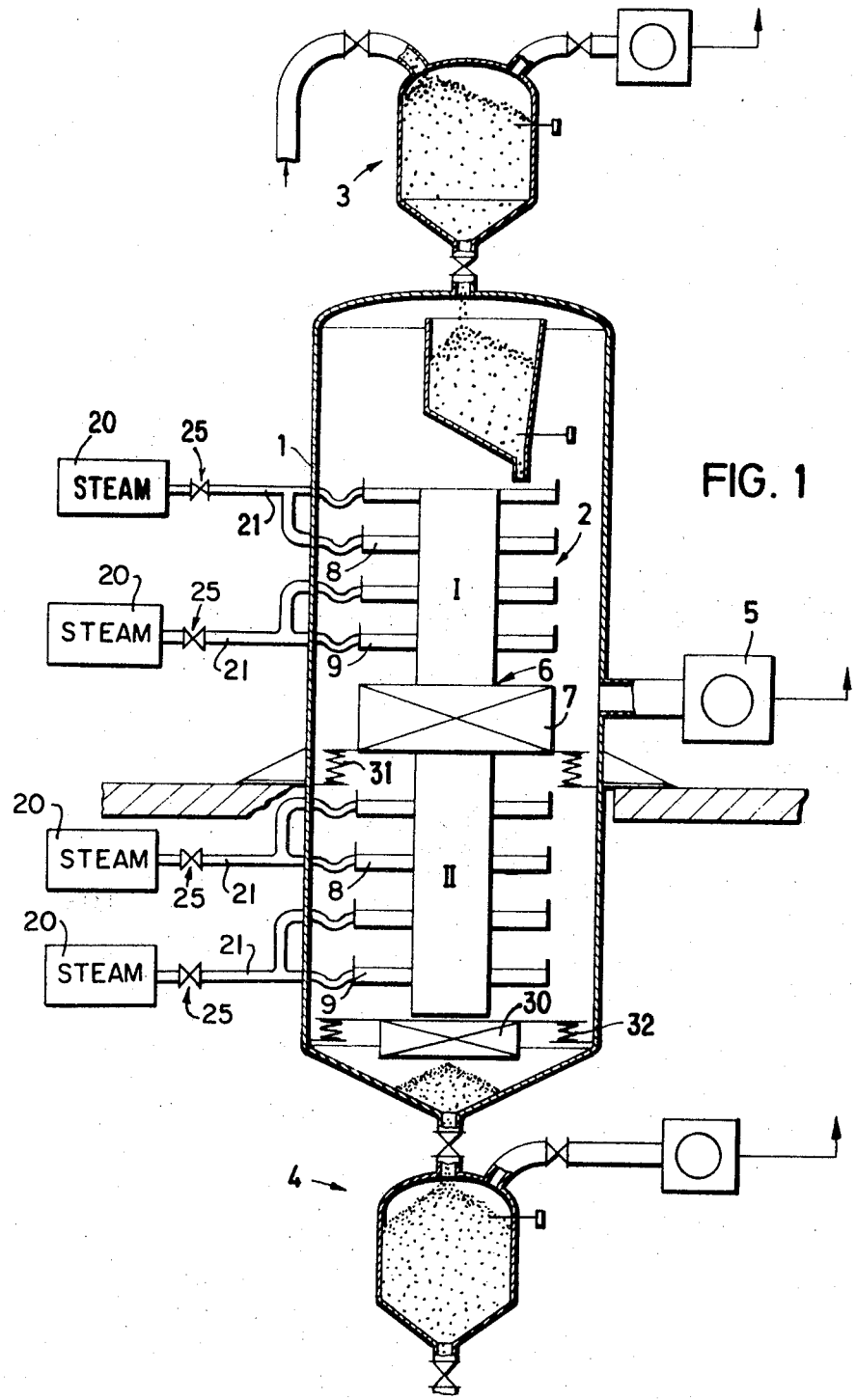
FIG. 1 is an elevational, partially cross sectional, partly schematic view of a device according to the invention.

The device of FIG. 1 includes a container 1, a cascade 2 mounted in the container, a section 3 for feeding material into the container, and a section 4 for removing treated material from the container. A vacuum is created in the container 1 by a pump unit 5.

The cascade 2 includes a central pipe 6 and a vibrational drive 7 interposed in the pipe about in the middle of the cascade but outside of the center of mass of the cascade. Vibrational drive 7 is an electromagnetic vibratory drive made of at least two electromagnetic vibration-producers and directing springs, which are so adjusted that the product is given the desired angle of throw. Such drives are available, for example, from the Vibration Technology Division of the firm AEG, Niederrath-Frankfurt a.M., West Germany. Above and below the vibrational drive 7 are in each case four annular treating trays 8, groups I and II, secured to pipe 6. The floors 9 of these trays are provided with conduits for conducting hot steam for the purpose of controlling the floor temperatures. These conduits may be fed individually or collectively according to the particular temperature program desired for the trays. Thus, for purposes of illustration, sets of two trays 8 are shown connected to a common steam source 20 by a branched hose 21 containing control valve 25, it being apparent that any of the hoses 21 could be branched to any number of the trays and that any suitable number of steam sources 20 of various temperature could be provided for various ones of the trays. Hoses 21 hang somewhat loosely in container 1, in order to accommodate the rotational vibrations of the tray to which it is connected. Temperature may be selected by appropriate opening or closing of respective valves 25.

A second vibrational drive 30 is shown in FIG. 1 for attachment to group II of the trays. When this drive 30 is connected to group II, group II is disconnected from drive 7, so that groups I and II vibrate completely independently of one another. Both drives are substantially isolated from container 1 by spring sets 31 and 32.

Figure 2:
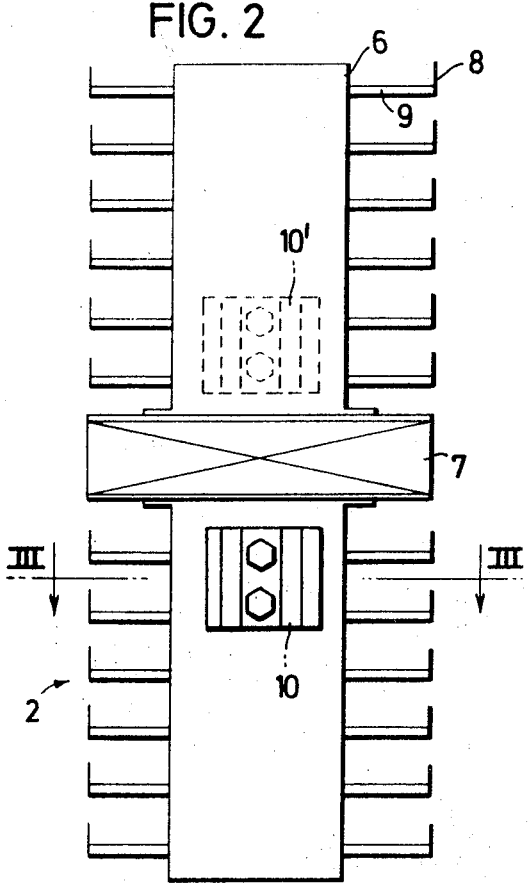
FIG. 2 is an elevational view of a modified portion of FIG. 1.
Figure 3:
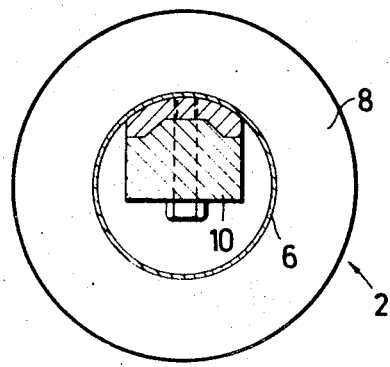
FIG. 3 is a cross sectional view from the line III—III of FIG. 2.

FIGS. 2 and 3 illustrate the provision of an auxiliary mass 10 in the interior of pipe 6 for creating different vibration amplitudes in the top and bottom parts of cascade 2. If the auxiliary mass 10 is below the vibrational drive 7, then the upper part of the cascade 2 vibrates with a larger amplitude than the lower part. If the auxiliary mass is above (dashed line representation, reference numeral 10'), then the lower part of the cascade 2 vibrates with a larger amplitude than the upper part.

Figure 4:
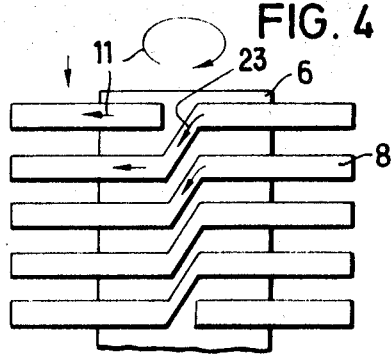
FIGS. 4 to 6 are elevational views showing modified portions of FIG. 1.
Figure 5:
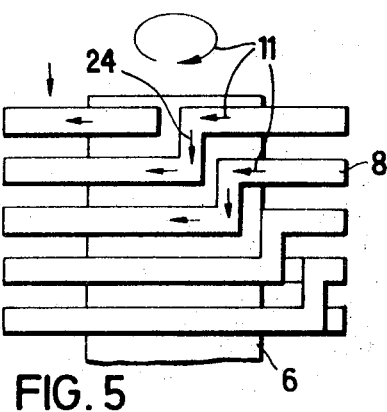

Simple possibilities for providing a mixing of the powdered or granular material while passing through the device of the invention are shown in FIGS. 4 and 5. The trays are all arranged horizontally and parallel to one another. The material moves on a circular path around one horizontal treatment tray 8 in the direction of arrow 11 and then falls from the outlet region of the tray obliquely in the direction of arrow 23 in FIG. 4 and vertically in the direction of arrow 24 in FIG. 5 downwardly into the inlet region of the next lower tray. This falling provides a good mixing of the material.

Figure 6:
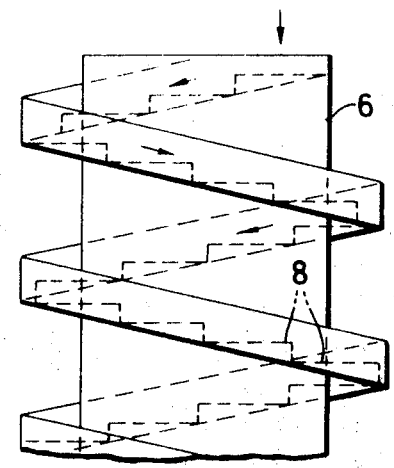

In the embodiment of FIG. 6, the treatment trays 8 are mounted one after the other like the stairs of a helical staircase, and a continual mixing of the material occurs as the material falls from the outlet region of one tray to the inlet region of the next lower tray. The effective path of the material as it is forwarded by the rotational vibrations is shown by the arrows.

Figure 7:
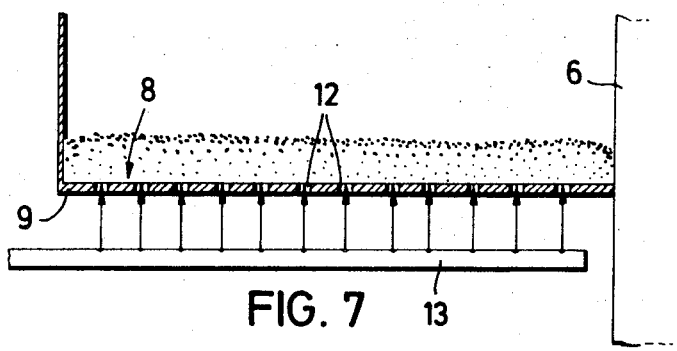
FIG. 7 is an elevational partially sectional view of a modified portion of FIG. 1.

An intensive mixing of the charged material can be obtained in the manner of FIG. 7 by jetting gas into the material through the floors 9 of the treatment trays 8. Thus, the floor 9 may be provided with openings 12, while below these openings is an inert gas line 13 provided with jets. The quantity of gas needed to provide a good mixing is so small, that a deterioration of the vacuum does not occur.

Figure 8:
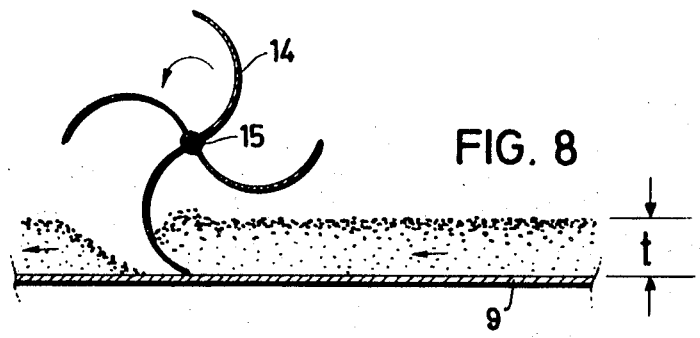
FIG. 8 is an elevational sectional view of a modified portion of FIG. 1.
Figure 9:
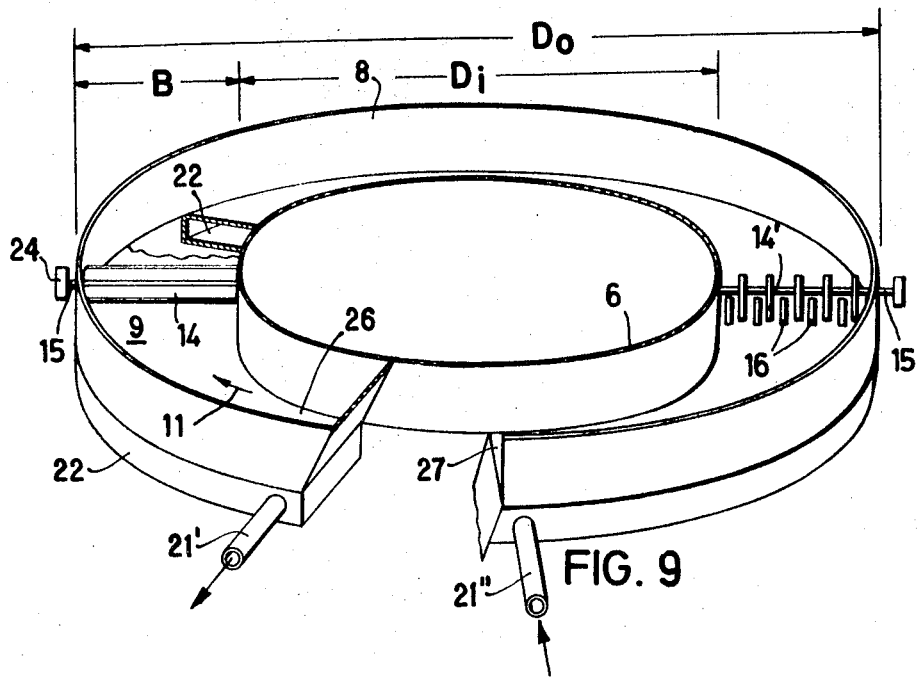
FIG. 9 is a perspective view of a modified portion of FIG. 1.

FIG. 8 shows a paddle wheel for agitating the material moving in the direction of the arrows on a floor 9 by scooping into material on the floor. The perspective view of FIG. 9 shows the paddle wheel and how its axis 15 is mounted in the outer side of the tray and in pipe 6. Means for rotating wheel 24 are not shown.

The right side of FIG. 9 illustrates an especially effective modification of the mixer of FIG. 8. The paddles are provided as spokes 14' and these move between upstanding comb teeth 16 mounted in the floor 9 of the tray 8.

FIG. 9 also illustrates in greater detail a typical tray of FIGS. 1, 2, and 4, with an inlet region 26, an outlet region 27, a conduit 22 in its floor 9 for the conduction of steam for controlling the floor temperature, a steam outlet hose portion 21' and a steam inlet hose portion 21''. In the process of the present invention, it is preferred to use layer depths $t$ (see FIG. 8) lying between 1 and 8 centimeters, with the smaller depths being used on the input side of the process. These depths have been found to give the shortest drying times.

Further illustrative of the invention is the following example.

EXAMPLE I

Granular polyester was dried in a vibratory dryer of the invention having a total of 24 square meters of tray surface for heat transfer. The trays were separated into two groups of 15 each, each tray having an outer diameter $D_o$, an inner diameter $D_i$, and a breadth B, as shown in FIG. 9, equal, respectively, to 1,200, 600, and 300mm. The interior of the container was evacuated to a pressure of 0.1 torr. The layer depth $t$ (see FIG. 8) was 2.5 centimeters in the upper group and 5 centimeters in the lower group. The temperature of the trays in the upper group increased from tray to tray from 100° to 140° C, while all trays of the lower group were held at 160° C. The very last tray was used for cooling the product. For a terminal water content of 0.003 weight-percent, a continuous throughput of 250 kilograms per hour could be attained. Mixing of the granular material occurred only when the material fell from an upper tray onto the next lower. An example of the polyester is Polyester Co-Polymer of the firm ICI, having a crystallization temperature region from 70° to 120° C, an apparent density around 800 kg/m³, and being in the form of chip-shaped granules of 4mm breadth, 4mm length, and 2mm thickness.

It will be understood that the above description of the present invention is susceptible to various modifications, changes and adaptations, and the same are intended to be comprehended within the meaning and range of equivalents of the appended claims.

1. A device for the thermal treatment of powdered or granular materials, comprising a container, a plurality of substantially circular tray means mounted one above the other in said container for the sequential transfer of material downwardly from an outlet region of one tray means to an inlet region of a next lower tray means, means for selectively controlling the temperatures of said tray means, and means for vibrating said tray means selectively and adjustably for moving material on said tray means from their inlet regions to their outlet regions with preselected material layer depths.

2. A device as claimed in claim 1, wherein said means for vibrating is provided as a plurality of independent vibrational drives.

3. A device as claimed in claim 1, wherein said tray means are connected to one another in a cascade and said means for vibrating comprises a vibrational drive interposed about in the middle of said cascade but outside of the center of mass of the cascade.

4. A device as claimed in claim 1, wherein said tray means are connected to one another in a cascade and said means for vibrating comprises a vibrational drive interposed about in the middle of said cascade, further comprising an auxiliary mass mounted to one half of said cascade.

5. A device as claimed in claim 1, further comprising means for mixing material on said tray means.

6. A device as claimed in claim 5, said means for mixing comprising a paddle wheel means for scooping into material on said tray means.

7. A device as claimed in claim 5, said means for mixing comprising means for jetting gas into material on said tray means.

8. A device as claimed in claim 1, wherein said tray means are mounted one after the other like the stairs of a helical staircase.

9. A device as claimed in claim 1, said tray means being arranged parallel to one another, one above the other, further comprising means for allowing material to fall from the outlet region of an upper tray means onto the inlet region of a next lower tray means.

10. A device as claimed in claim 1, wherein said tray means comprise annular trays.

11. A device as claimed in claim 1, wherein said means for temperature control comprises controllable means for heating said tray means with steam.

* * * * *